April 21, 1931.  S. A. MORSTON  1,801,872
COUPLING
Filed Feb. 28, 1928

Inventor
S. A. Morston,
By Clarence A. O'Brien
Attorney

Patented Apr. 21, 1931

1,801,872

UNITED STATES PATENT OFFICE

SOLOMON A. MARSTON, OF SEATTLE, WASHINGTON

COUPLING

Application filed February 28, 1928. Serial No. 257,671.

The present invention relates to an improved coupling for hose and pipe, and it has more particular reference to a coupling which has been expressly made for use in association with ordinary garden hose.

My principal aim is to provide a structure which facilitates connection of the hose with the water supply pipe in order to overcome certain disadvantages experienced with the usual swivel ring hose connector.

An object is to provide a structure of this class which is especially suitable for the purpose intended, owing to the ease with which the connection between the hose and pipe can be effected.

Another object is to provide something which, it is believed, will supersede previous devices, which has been previously unequaled in the art, a structure which is practical and modern, and which possesses distinguishing structural differences which make it an original entity.

Other objects and advantages of the invention will become more readily apparent from the following description and drawings.

In the drawings:—

Figure 1:
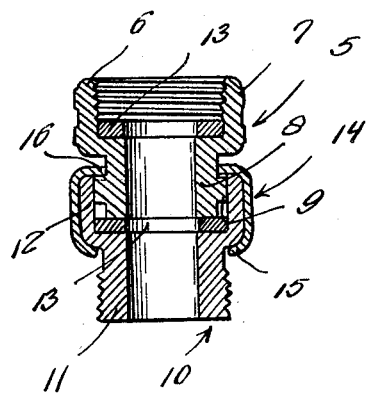
Figure 1 is a longitudinal section through a hose and pipe coupling, constructed in accordance with the present invention.
Figure 2:
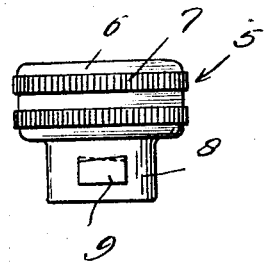
Fig. 2 is an elevational view of one of the principal parts of the invention.

Referring to the drawings by numerals, it will be observed that the reference character 5 designates a male member including an internally screw threaded portion 6 and external knurled finger wrench grips 7, and a reduced neck portion 8 provided with a pair of substantially diametrically opposite lugs 9.

The numeral 10 designates generally, the complemental female member including an externally screw threaded portion 11 and a receptacle portion 12 for reception of the lugged neck 8. At this time, I would call attention to the fact that the numeral 13 in both instances designate ordinary standard hose washers or gaskets which when located as shown, serve to provide water-tight connections.

Figure 4:
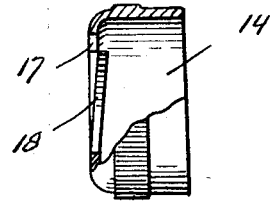
Fig. 4 is a side view in section and elevation of the ferrule.

The receptacle portion 12 of the member 10, carries a rotatable ferrule 14 having an inturned lip 15 at one end and an inturned flange 16 at the opposite end. In this connection it is obvious that the ferrule is made as shown in Fig. 4, and when assembling the structure, it is put in position before the lip 15 is formed or bent. Hence, it is an easy matter to slip the ferrule of Fig. 4, down over the receptacle 12 to bring the flange 16 into engagement with the open edge or end portion of the receptacle 12 and to then clinch the bendable edge portion of the ferrule against the portion shown in Fig. 1, to form the retaining lip 15. The flange 16 is formed with diametrically opposite notches 17 for passage of the lugs 9 and is provided with resilient retention tongues or fingers 18, which obviously, cooperate with the lugs in effecting a tight connection between the parts 5 and 10.

Figure 3:
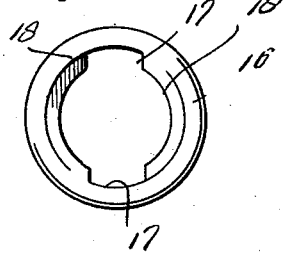
Fig. 3 is an elevational view of the ferrule.

In following the resilient retention tongues or fingers 18, it will be noted from a study of Figure 3 that the flange 16 of the ferrule on diametrically opposite sides thereof, are slit, the slits extending from adjacent opposite sides of the notches 17, and terminating or merging into the notches 17, at the other side of said notches. Thus, it is evident that one of the retaining tongues 18 will have its free end adjacent one side of one notch 17 while the other of said resilient retaining tongues 18 will have its free end at the opposite side of the other of said notches 17. Manifestly, when the lugs on the member 5 have been inserted through the notches 17, and the fingers being normally bent downwardly or inwardly as shown to advantage in Figure 4, will frictionally engage the respective lugs for binding engagement therewith, thus effecting a suitable retaining grip on the lug and at the same time, maintaining the ferrule 14 against casual displacement.

The ferrule is preferably provided with a knurled finger gripping rib as shown in Fig. 4. It is evident that the member or part 5 is threaded onto the water supply pipe while the part 10 is connected with the garden hose. Then the two parts are brought together and the lugs 9 slipped thru the notches 17, whereupon the ferrule is rotated to fasten the two parts together and to effect a water-tight connection.

It is believed that by considering the description in connection with the drawings, a clear understanding of the construction, operation, features and advantages of the invention will be had. Therefore, a more lengthy description has been regarded as unnecessary.

Minor changes coming within the field of invention claimed may be resorted to if desired.

Having thus described my invention, what I claim as new is:—

1. As a new product of manufacture, a coupling adapted for disposition between an ordinary house water supply pipe and a conventional garden hose, said coupling comprising a male member adapted for connection with the water supply pipe and provided with a neck having diametrically opposite lugs, a female member adapted for connection with the hose and provided with a receptacle portion telescopically receiving the lugged neck, a ferrule swivelly mounted on said receptacle portion and provided with an inturned flange having diametrically opposite notches and resilient arcuate retention tongues for cooperation with said lugs, whereby to provide a separable connection between said members.

2. In a coupling of the class described, a male member provided with an internally screw threaded portion, and an external knurled wrench grip, said male member being formed with a reduced neck portion having diametrically opposite lugs, a female member externally screw threaded at one end and formed at its other end with a receptacle portion telescopically receiving the lug neck, a ferrule swivelly mounted on said receptacle portion and provided with an inturned lip at one end, an inturned flange at the opposite end of said ferrule, said flange being formed with diametrically opposite notches and arcuate resilient retention tongues for rotary connection with the lugs on said neck.

3. In a coupling of the class described, a male member provided with an internally screw threaded portion, and an external knurled wrench grip, said male member being formed with a reduced neck portion having diametrically opposed lugs, a female member externally screw threaded at one end and formed at its other end with a receptacle portion telescopically receiving the lugged neck, a ferrule swivelly mounted on said receptacle portion and provided with an inturned lip at one end, an inturned flange at the opposite end of said ferrule, said flange being formed with diametrically opposite notches, and said flange on diametrically opposite sides of said ferrule being arcuately slit to provide a pair of resilient retention tongues, the free end of one tongue being adjacent one side of one of said notches, and the free end of the other of said tongues having its free end adjacent the opposite side of the other of said notches, said retention tongues adapted for frictional engagement with the lugs on the neck of said male member.

In testimony whereof I affix my signature.

SOLOMON A. MARSTON.